Jan. 29, 1952     L. M. FRANCIS     2,583,734
AUTOMOBILE TRANSPORTING TRAILER
Filed July 25, 1947     3 Sheets-Sheet 1
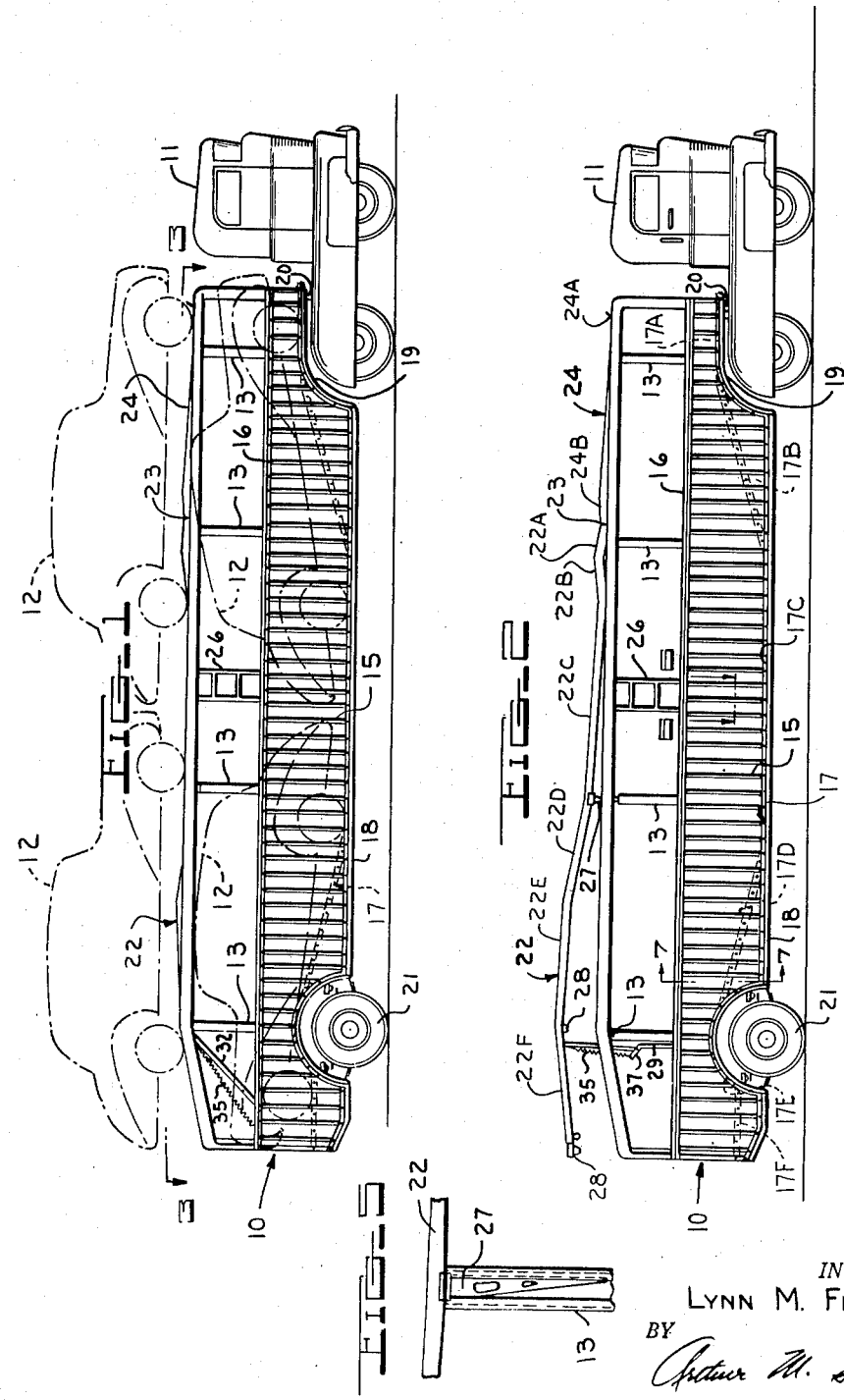
INVENTOR.
LYNN M. FRANCIS
BY
*Arthur M. Smith*
ATTORNEY Jan. 29, 1952      L. M. FRANCIS      2,583,734
AUTOMOBILE TRANSPORTING TRAILER
Filed July 25, 1947      3 Sheets-Sheet 2
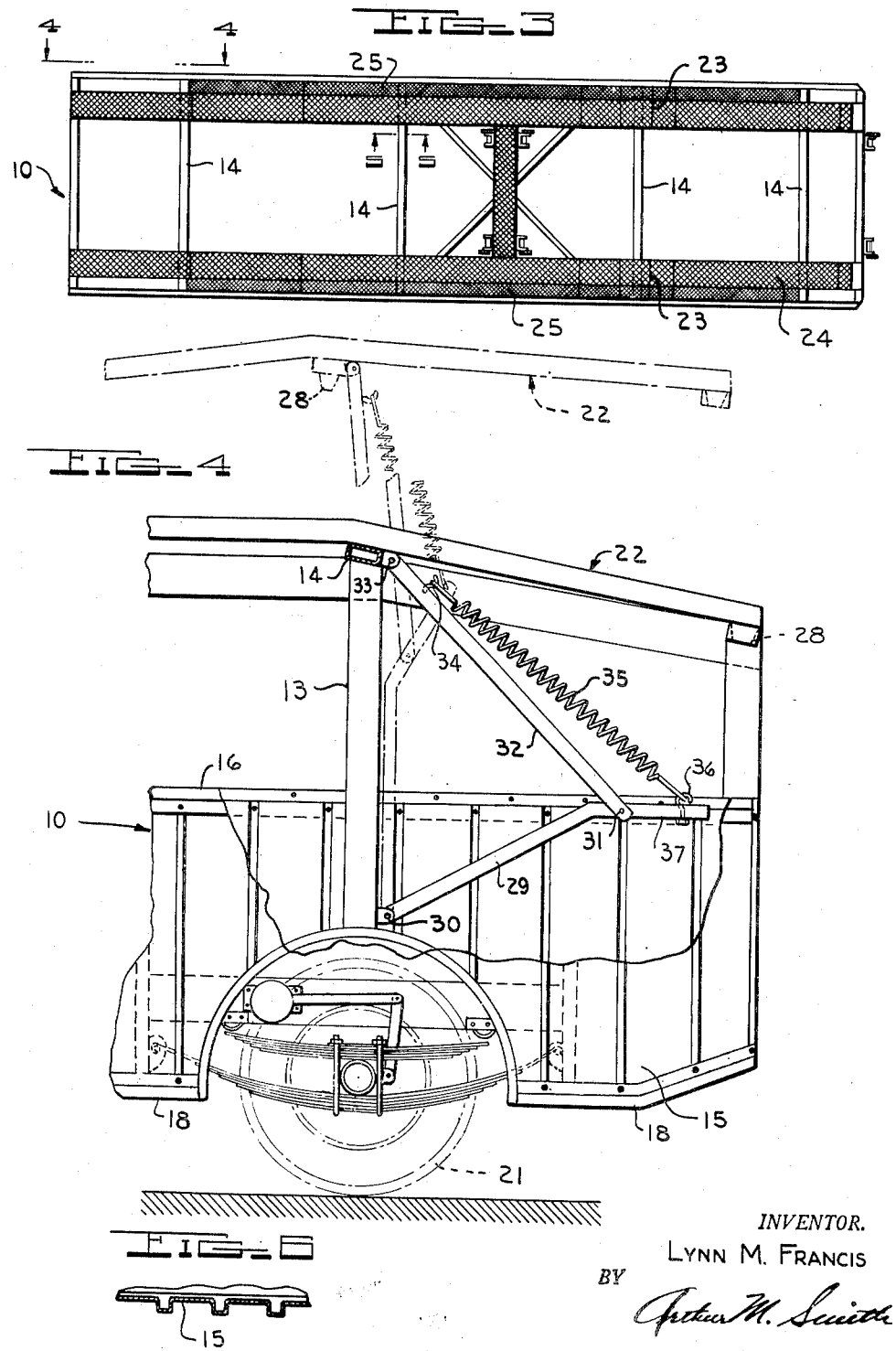
INVENTOR.
LYNN M. FRANCIS
BY
ATTORNEY Jan. 29, 1952  L. M. FRANCIS  2,583,734
AUTOMOBILE TRANSPORTING TRAILER
Filed July 25, 1947  3 Sheets-Sheet 3
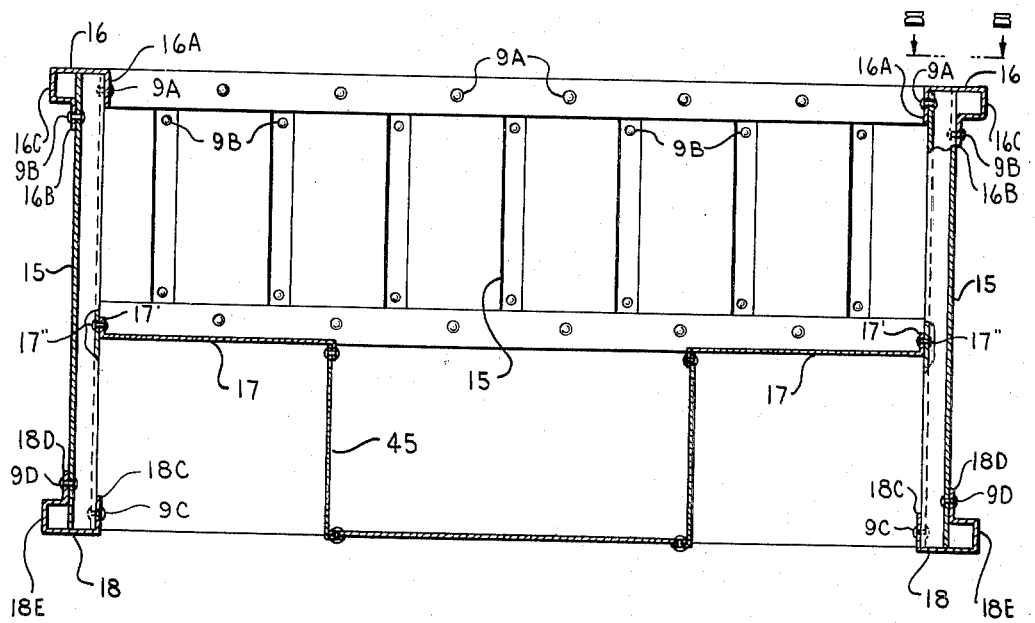
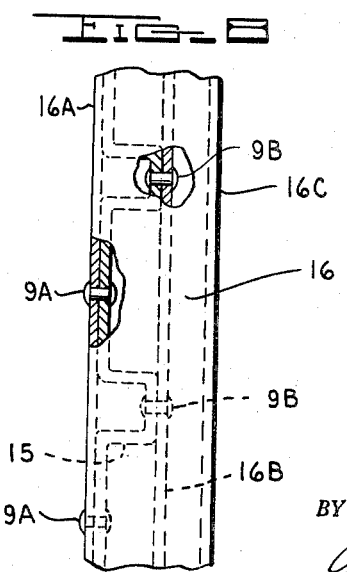
INVENTOR.
LYNN M. FRANCIS
BY
*Arthur M. Smith*
ATTORNEY Patented Jan. 29, 1952

2,583,734

UNITED STATES PATENT OFFICE 2,583,734

AUTOMOBILE TRANSPORTING TRAILER

Lynn M. Francis, Detroit, Mich.

Application July 25, 1947, Serial No. 763,480

1 Claim. (Cl. 296—1)

The present invention relates to an improved trailer construction which is particularly adapted for hauling automobiles.

A primary object of the present invention is to provide a compact and lightweight automobile carrying trailer of improved construction adapted to carry four full sized automobiles in an appreciably shorter space and at a lower center of gravity than is possible with conventional types of similar trailers, and which provides a lightweight, readily repaired, rigid, truss-type construction adapted to withstand severe strains in use.

Other objects of the present invention are to provide an automobile carrying trailer having a lower deck and an upper deck and which provides means to facilitate loading of the lower deck by pivotally raising the upper deck, and to provide improvements in such a pivotal upper deck construction wherein the upper deck is supported against lateral movement regardless of its position, and wherein pivotal movement of the upper deck is facilitated by means of a simplified spring loaded counterbalance therefor.

Another object of the present invention is to provide a lower deck construction having an open wheel housing to permit a ready flow of air therethrough for cooling the tires, wheels, and brakes. This construction has been found to be particularly effective in prolonging the life of the tires.

Other objects of this invention will appear in the following description and appended claim, reference being had to the accompanying drawings forming a part of this specification wherein like reference characters designate corresponding parts in the several views.

In the drawings:

Fig. 1 is a side view of a trailer embodying the present invention and coupled with a tractor, four automobiles being shown in the loaded position in phantom.

Fig. 2 is essentially the same view as Fig. 1, but with the upper deck being shown in the raised loading position for loading the lower deck.

Fig. 3 is essentially a plan view of the trailer shown in Fig. 1 with the tractor removed, taken in the direction of the arrows 3—3 of Fig. 1.

Fig. 4 is a fragmentary enlarged side view, with portions broken away, showing the counterbalancing mechanism and being taken in the direction of the arrows essentially along the line 4—4 of Fig. 3.

Fig. 5 is a fragmentary enlarged view taken in the direction of the arrows substantially along the line 5—5, Fig. 3, with one side of the guide post removed to show the guide means for bracing the upper deck against lateral movement.

Fig. 6 is a horizontal section through the corrugated trailer side walls, taken in the direction of the arrows essentially along the line 6—6, Fig. 2.

Fig. 7 is a fragmentary enlarged vertical section through the trailer rear wheels, taken in the direction of the arrows substantially along the line 7—7 of Fig. 2.

Fig. 8 is a fragmentary top view of a portion of one of the upper rub rails with portions broken away, taken in the direction of the arrows 8—8 of Fig. 7.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a particular embodiment of the present invention is shown by way of example wherein a semi-trailer, indicated generally by the numeral 10, and formed preferably of a sheet metal, welded construction, is shown in position with its tractor 11. Four automobiles 12 are shown in phantom in the loaded position.

The body of the trailer 10 comprises a trusslike construction braced by the plurality of upright supports 13 and the plurality of horizontal cross-braces 14. The sides 15 of the trailer are preferably of sheet metal corrugated construction, Fig. 6, braced along the top and bottom portions thereof respectively by attachments with the top rail 16 and the lower reinforcing rail 18. The sides 15 are also braced by attachment with the lateral edges of the bottom deck, which latter is indicated generally by the numeral 17, Figs. 1 and 2. The forward end of the trailer 10 provides the cut-out portion 19 which is adapted to overlie the rear portion of the body of the tractor 11 for attachment therewith, as by the pin 20.

Details of the corrugated trailer side wall construction are shown in Figs. 7 and 8 wherein the top rail 16 is shown as a longitudinal channel member, enclosing the top edges of the corrugated sides 15, having parallel longitudinal edges 16A and 16B secured to each corrugation of the sides 15 on the inside and outside thereof by the plurality of rivets 9A and 9B respectively, and being bent outwardly at 16C to provide a longitudinally extending external upper rub rail. The lower rail 18 is similarly constructed to enclose the bottom edges of the corrugated sides 15, and provides the parallel longitudinal edges 18C and 18D secured to each corrugation of the sides 15 on the inside and outside thereof by the plurality of rivets 9C and 9D respectively, and is bent outwardly at 18E to provide an external longitudinally extending external lower rub rail. Fig. 7 shows the upward extending flange 17' which runs along the side of each track 17 adjacent the trailer side 15 and is secured thereto by the plurality of rivets 17".

The obvious advantages of the corrugated construction shown may be observed by comparing conventional construcions of similar automobile carrying trailers wherein a sturdy frame is first built, usually employing a plurality of vertical trusses braced by diagonally extending compression resisting beams. The lower deck is then mounted on the frame prepared therefor. In the present construction, the lightweight sheet metal sides 15 are self-reinforcing and permit the elimination of the separate diagonal compression resisting beams. Each corrugation, being secured at the top and bottom to the rails 16 and 18, and the internal corrugations being secured to the essentially diagonally extending lower ramp 17, serve as the vertical trusses. The broad faces of the internal corrugations serve as lightweight tension resisting strusts to prevent longitudinal movement of the rails 16 and 18 relative to each other.

Thus a sturdy, lightweight trailer is provided having side portions of vertically corrugated sheet metal panels which may be readily prefabricated and riveted or welded in place to effect a rigid truss-type construction, light in weight and yet adapted to withstand severe strains in use, and being particularly desirable for lowering hauling costs by reducing the dead weight of the trailer, thereby increasing both the gasoline and the tire mileage.

Referring to Figs. 1 and 2, the lower deck 17 extends from a horizontal forward front wheel supporting portion 17A over the cut-out portion 19, inclines rearward and downward therefrom along the portion 17B to the horizontal centrally located rear wheel supporting portion 17C, then inclines upward and rearward along 17D at a sufficient angle to clear the rear trailer wheels 21, then declines sharply along 17E to the horizontal rear front wheel supporting portion 17F.

The upper deck provides two parallel track portions including a pivotal portion, indicated generally by the numeral 22, which comprises the major portion of the upper deck and is pivotally connected at 23 to a short rigid track portion. The latter is indicated generally by the numeral 24 and is rigidly secured to the frame structure of the trailer 10. The upper deck track portion 24 inclines rearward and upward from the forward stop 24A, located above the forward front wheel supporting portion 17A of the lower deck, to the horizontal portion 24B adjacent the hinge 23. When the upper deck is in the lowered carrying position shown in Fig. 1, the pivotal upper deck track portion 22 extends horizontally from the pivot 23 along the portion 22A, declines along 22B to the horizontal centrally located wheel supporting portion 22C which is located essentially over the centrally located rear wheel supporting portion 17C, then inclines upward along 22D, downward along 22E, and relatively sharply downward along 22E, and relatively sharply downward along 22F to the rear end of the upper deck track 22.

Access to the cars loaded on the upper deck is facilitated by the catwalk 25, extended laterally from each of the tracks of the deck portions 22 and 24, and the ladder 26 secured to the side of the frame of the trailer 10 and leading to the catwalk 25. The portion of the catwalk 25 extended laterally from the track 22 has the same contour as that track and is pivotally movable therewith. The catwalk portion 25 which extends laterally from the track 24 has the contour of that track and is rigidly secured thereto.

The pivotal upper deck 22 is braced against lateral movement by one or more triangular depending guide shafts 27 which extend downward from opposite sides of the upper deck 22 and project into certain of the vertical tubular supports 13. Fig. 5 shows one of the supports 13 which is preferably located along the side of the track 22 near its midportion and which provides a flattened tubular structure open at its upper end for receiving one of the guide shafts 27. One side of the tubular support 13 in Fig. 5 is removed to show the triangular shape of the guide shaft 27 which permits all portions thereof to clear the upper opening or guide slot of the vertical support 13 therefor as the guide 27 subscribes an arc about the pivot 23 upon the pivotal raising of the rear end of the upper deck 22.

A plurality of downward projections 28 are also provided by the pivotal upper deck 22 to fit within the open ends or sockets provided by other upright supports 13, Fig. 4. Thus the upper deck 22 is securely held against lateral movement that might otherwise result, for example, when the loaded trailer makes a curve at high speed.

Pivoted movement of the upper deck 22 is facilitated by the spring loaded counterbalancing mechanism which operates essentially to counterbalance the upper deck 22 at any pivotal position. The counterbalancing mechanism comprises a lower arm 29 pivotally connected at 30 to rigid portion of the frame of the trailer 10, and also pivotally connected at 31 to an upper arm 32, which in turn is pivotally secured at 33 to the upper deck essentially directly above the pivot 30. The upper arm 32 provides a hook 34 for the upper end of the coil spring 35. The lower end of the spring 35 is secured to the hook 36 provided by the projecting dog-leg extension 37 of the lower arm 29, Fig. 4.

It is to be noted from Fig. 4 that the pivotally connected lever arms 29 and 32 are angularly connected at the pivot 31 and are adapted for pivotal movement essentially in a vertical plane to move from a lowered position, at which the upper deck 22 is in a carrying position, to a raised position, at which the upper deck 22 is in a loading position to permit loading of the lower deck 17. The spring 35 is preferably under a tension at all times to widen the angle between the arms 29 and 32 and thereby to raise the pivotal upper deck 22 to the raised or loading position. By virtue of the dog-leg extension 37, the tension on the spring 35 is never directed along the longitudinal axes of both arms 32 and 29 at the same time, even with the rear end of the pivotal upper deck 22 at the upper limit of its raised position, shown in phantom, Fig. 4. Accordingly, an effective leverage is always available to assist the spring 35 in offsetting the weight of the deck 22 in any pivotal position thereof.

It is also to be observed from Fig. 4 that the essential features of the specific spring loaded counterbalance shown in the preferred embodiment of the present invention may be readily modified while still preserving the essential feature thereof. For example, although the embodiment shown is preferred because of its simplicity and efficiency, the upper hook 34 may be readily secured to the pivotal portion of the upper deck 22 relatively near the pivot 33. Likewise, the pivot 30 between the arm 29 and the frame of the trailer 10 may be readily located above the pivot 33 on an upward extension of the frame of the trailer 10.

In order to load the trailer 10, the hinged upper deck 22 is first raised. The lower deck 17 is then loaded with the cars back to back in tandem. The first car is driven into the forward portion of the lower deck with its front wheels on the forward front wheel supporting portion 17A and with its front end extended through the open forward end of the trailer and overlying the king pin connection between the tractor 11 and the trailer 10. The second car is backed into position on the lower deck with the front portion thereof extended toward the rear of the trailer and with its front wheels on the rearward front wheel supporting portion 17F at a higher level and to the rear of the trailer rear wheels 21. The rear wheels of each car are centrally located on the horizontal rear wheel supporting portion 17C. The top deck 22 is then lowered and secured in position to permit loading of the two top cars which face forward and ride approximately in a level position.

It has long been common to employ an upper deck having a short hinged rear portion so as to permit loading of the lower deck. However, such construction necessarily required that the immovable major portion of the upper track forward from the hinge be at the highest level required to clear the uppermost portions of the automobiles on the lower ramp. Prior to the present invention, those familiar with the use and construction of automobile carrying trailers had not considered the practicability of pivotally raising the major portion of the upper deck about a pivot above or shortly to the rear of the uppermost portion of the forward lower automobile, particularly with the latter in a loaded position as shown in Fig. 1.

By virtue of the position of the pivot 23 which permits pivotal raising of approximately the rearward two-thirds of the upper deck, and in cooperation with the contour of the upper tracks 22 and 24, the upper tracks closely overlie the tops of the cars on the lower deck, thereby reducing the center of gravity of the loaded trailer by lowering the wheel supporting portions of the upper deck, yet providing suitable clearance for the tops of the cars 12. The arrangement of the upper and lower decks shown permits a compactness in loading not heretofore possible, so that a thirty-three foot trailer embodying the present invention has been found to have the effective automobile carrying capacity of the standard thirty-five foot trailer. The arrangement shown also permits a lowering of the overall height of the loaded trailer 10 by several inches, so as to satisfy the maximum height limitations of each State in the United States.

The specific contour of the upper tracks 22 and 24 may be varied within the spirit of the present invention to satisfy particular requirements. The important features of the contour to be noted are the arched portion provided by the inclines 22D and 22E between the wheel supporting portions 22C and 22F, and the arched portion provided by the inclines between the wheel supporting portions 22C and the forward end of the stationary track 24 adjacent the stop 24A.

The effort of raising and lowering the hinged upper deck 22 is reduced to a minimum by the spring loaded counterbalancing mechanism which essentially balances the weight of the unloaded upper track 22 when the latter is in either the carrying or the loading position. The spring 35 and the ratio of the leverages provided by the lever arms 29, 32, and 37 are preferably adapted to permit pivotal raising or lowering of the upper deck 22 from one position to another with an approximate force of 25 pounds.

An additional significant improvement in trailer construction provided by the present invention is that the underportions of the ramp 17 are unobstructed, as shown in Fig. 7, and the inclined portions 17B and 17D permit an open structure for the housings around the trailer wheels 21 and the rear wheel of the tractor 11. Thus a ready flow of air around the tires, wheels and brakes is permitted which is particularly desirable in cooling the tires and has been found in actual tests to substantially increase the tire mileage. In the preferred construction described herein a depending compartment 45, having a flat horizontal bottom and vertical sides, Fig. 7, is disposed between and suspended from the two lateral tracks 17 at the rearward portion of the trailer 10. The compartment 45 may be conveniently used for carrying miscellaneous equipment and is centrally located so as not to interfere with the free flow of air around the wheels 21. The compartment 45 does not extend the full length of the trailer 10, so that the bottom of the forward portion of the trailer 10 follows the contours of the track portion 17A and 17B.

I claim:

In an automobile carrying trailer, the combination of a pair of longitudinally extending laterally spaced sides, a lower automobile carrying deck, an upper automobile carrying deck, means to facilitate loading of said lower deck by pivotally raising the rear portion of said upper deck and including a pivotal connection between said trailer and said upper deck near the forward end thereof, and means to prevent substantial lateral movement of said upper deck including a plurality of upright posts mounted vertically along the sides of said trailer and having vertical slots therein, and a plurality of elongated guide shafts depending from said upper deck along the sides thereof, said guide shafts being tapered to a relatively narrow lower end and being thus adapted to telescope freely in and out of said slots as the upper track is pivoted, said guide shafts being partially disposed in the slots in all pivoted positions of said upper deck to prevent lateral misalignment thereof.

LYNN M. FRANCIS.

REFERENCES CITED

The following references are of record in the file of this patent:

UNITED STATES PATENTS

| Number | Name | Date |
| --- | --- | --- |
| Re. 19,776 | Judd | Dec. 3, 1935 |
| 1,809,557 | Lishon | June 9, 1931 |
| 1,922,027 | Carter | Aug. 15, 1933 |
| 1,931,803 | Perkins et al. | Oct. 24, 1933 |
| 1,994,695 | Dolan et al. | Mar. 19, 1935 |
| 2,119,671 | Francis | June 7, 1938 |
| 2,146,567 | Dondlinger | Feb. 7, 1939 |
| 2,169,648 | Judd | Aug. 15, 1939 |
| 2,384,795 | Candy | Sept. 18, 1945 |
| 2,387,874 | Bradley | Oct. 30, 1945 |